US012685899B2

(12) United States Patent      (10) Patent No.:   US 12,685,899 B2

Xu et al.               (45) Date of Patent:      Jul. 21, 2026

---

(54) DETECTING A MOVING BALL IN IMAGES

(71) Applicant: RAPSODO PTE. LTD., Singapore (SG)

(72) Inventors: Dejiang Xu, Singapore (SG); Yasar Burak Savak, Singapore (SG); Batuhan Okur, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 260 days.

(21) Appl. No.: 18/674,373

(22) Filed: May 24, 2024

(65) Prior Publication Data

US 2025/0360356 A1     Nov. 27, 2025

(51) Int. Cl.
| | |
|---|---|
| *G06V 10/764* | (2022.01) |
| *A63B 24/00* | (2006.01) |
| *G06T 3/4046* | (2024.01) |
| *G06V 10/26* | (2022.01) |
| *G06V 10/766* | (2022.01) |
| *G06V 10/774* | (2022.01) |

(Continued)

(52) U.S. Cl.
CPC ........ *A63B 24/0021* (2013.01); *G06T 3/4046* (2013.01); *G06V 10/267* (2022.01); *G06V 10/764* (2022.01); *G06V 10/766* (2022.01); *G06V 10/774* (2022.01); *G06V 10/82* (2022.01); *G06V 20/60* (2022.01); *A63B 2024/0034* (2013.01); *A63B 2102/20* (2015.10); *A63B 2220/05* (2013.01); *A63B 2220/806* (2013.01)

(58) Field of Classification Search
CPC ........ A63B 24/0021; A63B 2024/0034; A63B 2102/20; A63B 2220/05; A63B 2220/806; G06T 3/4046; G06V 10/267; G06V 10/764; G06V 10/766; G06V 10/774; G06V 10/82; G06V 20/60
See application file for complete search history.

(56) References Cited

U.S. PATENT DOCUMENTS

| | | | | |
|---|---|---|---|---|
| 10,582,008 | B2 * | 3/2020 | Richard | ................ H04L 67/306 |
| 2021/0049770 | A1 * | 2/2021 | Ford | ..................... G06F 18/211 |

(Continued)

OTHER PUBLICATIONS psu.edu [online], Collins, "Mean-shift Tracking," 2006, retrieved on Jul. 12, 2024, retrieved from URL<https://www.cse.psu.edu~rtc12/CSE598G/introMeanShift.pdf>, 93 pages.

(Continued)

*Primary Examiner* — Carol W Chan
(74) *Attorney, Agent, or Firm* — FISH & RICHARDSON P.C.

(57) ABSTRACT

In a first step, a time series of images are resized to a smaller dimension, and the smaller images are fed into a first classifier that is trained to classify as a ball any objects in the smaller images that resemble a ball. In a second step, the smaller images are mapped back to the series of images, and regions in the series of images that contain the mapped ball are cropped from the series of images. The mapped ball is shifted based on a velocity of the mapped ball in the cropped regions, and the second classifier regresses center coordinates and a radius of the shifted ball, classifies whether the shifted ball is the ball based on a confidence score, and updates the shifted ball in the cropped regions based on the regressed center coordinates and radius.

12 Claims, 3 Drawing Sheets

(51) Int. Cl.
| | |
|---|---|
| *G06V 10/82* | (2022.01) |
| *G06V 20/60* | (2022.01) |
| *A63B 102/20* | (2015.01) |

(56) References Cited

U.S. PATENT DOCUMENTS

| | | | | |
|---|---|---|---|---|
| 2022/0051020 A1* | 2/2022 | Jha | ........................ | G06V 10/945 |
| 2023/0289981 A1* | 9/2023 | Habib | .................. | G01B 11/002 |
| 2024/0420346 A1* | 12/2024 | Messina | .................. | G06T 7/251 |
| 2025/0281795 A1* | 9/2025 | Regan | ................ | A63B 24/0021 |

OTHER PUBLICATIONS wisdom.weizmann.ac.il [online], Ukrainitz et al., "Mean Shift Theory and Applications," available on or before Dec. 5, 2004, via Internet Archive: Wayback Machine URL <https://web.archive.org/web/20090205134009/www.wisdom.weizmann.ac.il~deniss/vision_spring04/files/mean_shift/mean_shift.ppt>, retrieved on Jul. 12, 2024, URL<www.wisdom.weizmann.ac.il/~deniss/vision_spring04/files/mean_shift/mean_shift.ppt>, 85 pages.

* cited by examiner

200

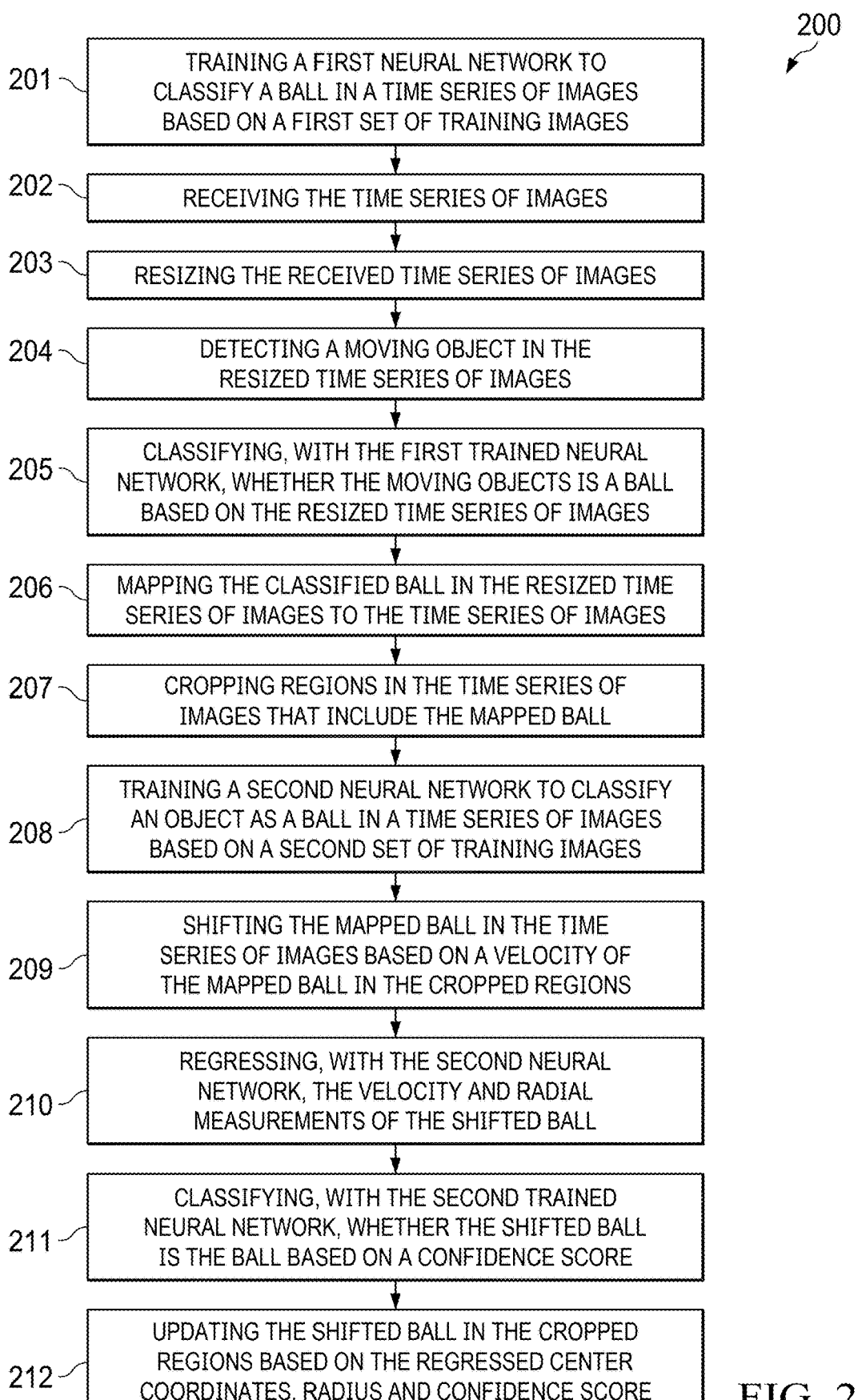

201 — TRAINING A FIRST NEURAL NETWORK TO CLASSIFY A BALL IN A TIME SERIES OF IMAGES BASED ON A FIRST SET OF TRAINING IMAGES

202 — RECEIVING THE TIME SERIES OF IMAGES

203 — RESIZING THE RECEIVED TIME SERIES OF IMAGES

204 — DETECTING A MOVING OBJECT IN THE RESIZED TIME SERIES OF IMAGES

205 — CLASSIFYING, WITH THE FIRST TRAINED NEURAL NETWORK, WHETHER THE MOVING OBJECTS IS A BALL BASED ON THE RESIZED TIME SERIES OF IMAGES

206 — MAPPING THE CLASSIFIED BALL IN THE RESIZED TIME SERIES OF IMAGES TO THE TIME SERIES OF IMAGES

207 — CROPPING REGIONS IN THE TIME SERIES OF IMAGES THAT INCLUDE THE MAPPED BALL

208 — TRAINING A SECOND NEURAL NETWORK TO CLASSIFY AN OBJECT AS A BALL IN A TIME SERIES OF IMAGES BASED ON A SECOND SET OF TRAINING IMAGES

209 — SHIFTING THE MAPPED BALL IN THE TIME SERIES OF IMAGES BASED ON A VELOCITY OF THE MAPPED BALL IN THE CROPPED REGIONS

210 — REGRESSING, WITH THE SECOND NEURAL NETWORK, THE VELOCITY AND RADIAL MEASUREMENTS OF THE SHIFTED BALL

211 — CLASSIFYING, WITH THE SECOND TRAINED NEURAL NETWORK, WHETHER THE SHIFTED BALL IS THE BALL BASED ON A CONFIDENCE SCORE

212 — UPDATING THE SHIFTED BALL IN THE CROPPED REGIONS BASED ON THE REGRESSED CENTER COORDINATES, RADIUS AND CONFIDENCE SCORE

FIG. 2

DETECTING A MOVING BALL IN IMAGES

TECHNICAL FIELD

This disclosure relates generally to sports technologies and data analytics, and in particular to detecting a moving ball in a series of images.

BACKGROUND

Data-driven sports technologies and data analytics help players and coaches better understand performance through reliable data. One such sports technology is using sensors, such as a camera, to measure a trajectory and various parameters of a ball in flight. To track a moving ball, a ball tracking system must first detect the moving ball in a series of image frames captured by the camera. Conventional methods include frame difference techniques such as finding the difference in corresponding pixel values between image frames. A drawback of this technique, however, is the computation cost associated with comparing each pixel in an image frame with a corresponding pixel in another image frame.

SUMMARY

Embodiments are disclosed for detecting a moving ball (e.g., a cricket ball) in a series of images. In a first step (hereinafter also referred to as "coarse ball finding"), a time series of images captured by a camera of a ball finding system are resized to a smaller dimension, and the smaller images are fed into a first neural network that is trained to classify as a ball any objects in the smaller images that resemble a ball. An advantage of resizing the original images to a smaller dimension is the reduced computation time needed to classify an object as a ball in the smaller image. However, this reduced computation time is at the expense of increased false positives.

In a second step (hereinafter also referred to as "fine ball finding"), the smaller images are mapped back to the series of images, and regions in the series of images that contain the mapped ball are cropped from the series of images. This step results in a series of cropped regions (hereinafter, also referred to as "local regions"), each of which contains the mapped ball. Next, a velocity is applied to the mapped ball in the cropped regions to generate new images of the mapped ball in the cropped regions, where the mapped ball is shifted in the cropped regions based on the applied velocity.

The new images with the shifted ball having a region of interest (ROI), which are then fed into a second neural network that is trained to regress center coordinates (x, y) and a radius (r) of the shifted ball and to classify the shifted ball as the ball. If the shifted ball is classified as the ball based on a confidence score, the trained second neural network outputs a regressed center coordinates and radius of the ball in the ROI. If the shifted ball is not classified as a ball, then the second neural network returns to the coarse ball finding step and the foregoing process is repeated on a new series of images. In some embodiments, the ROI may be a boundary box.

In some embodiments, a method comprises: training a first neural network to classify a ball in a time series of images based on a first set of training images; receiving, with a processor, the time series of images; resizing, with the processor, the received time series of images; detecting, with the processor, a moving object in the resized time series of images; and classifying, with the first trained neural network, whether the moving object is a ball based on the resized time series of images.

In some embodiments, resizing includes resizing the received time series of images to a dimension smaller than the time series of images.

In some embodiments, the method further comprises: mapping, with the processor, the classified ball in the resized time series of images to the time series of images.

In some embodiments, the method further comprises: cropping, with the processor, regions in the time series of images that include the mapped ball.

In some embodiments, the method further comprises: shifting, with the processor, the mapped ball in the time series of images based on a velocity of the mapped ball in the cropped regions; regressing, with a second trained neural network, center coordinates and a radius of the shifted ball, wherein the second trained neural network is trained on a second set of training images; classifying, with the second trained neural network, whether the shifted ball is the ball based on a confidence score; and updating, with the processor, the shifted ball in the cropped regions based on the regressed center coordinates, radius and confidence score.

In some embodiments, the velocity of the mapped ball is based on a change in center coordinates of the mapped ball.

In some embodiments, the first and second neural networks are trained using synthetic training data comprising images of balls augmented with at least one of shadows, sunshine, non-uniform lighting, complex background, artifacts, static balls, different ball sizes, moving background or dirty balls.

In some embodiments, the ball is a cricket ball.

In some embodiments, the time series of images includes at least two image frames.

Other embodiments can include a system, apparatus and computer-readable medium, where the computer-readable medium stores instructions that when executed by at least one processor cause the at least one processor to perform the method steps described above.

Particular embodiments described herein provide one or more of the following advantages. The disclosed ball finding system and method applies a two-step machine learning process to a time series of images captured by a camera of a ball finding system to detect a moving ball at less computational expense than existing frame comparison methods. As the images used in the method described herein are reduced to a smaller size, the computer memory usage is reduced thereby increasing computation speed. Additionally, since the reduced sized images are used, the method described herein uses reduced neural network size thus advantageously reducing the computation time. Further, the number of potential regions in the images is also reduced as the method is designed to detect the moving ball in cropped region(s), thus reducing the computer memory usage.

BRIEF DESCRIPTION OF THE DRAWINGS

FIG. 2 is a flow diagram of a process of detecting a ball in a series of images with a two-step machine learning process, according to one or more embodiments.

DETAILED DESCRIPTION

Figure 1:
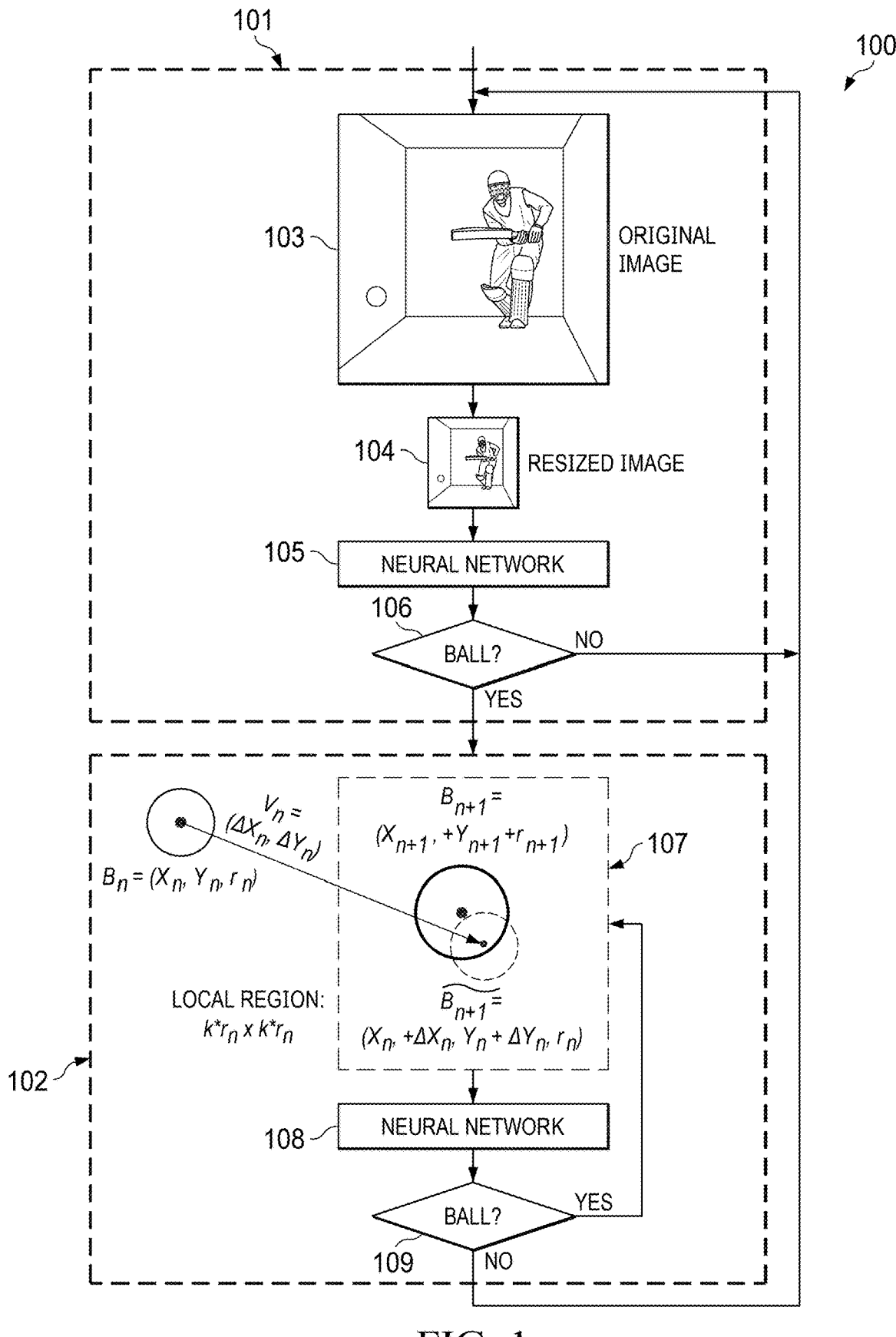
FIG. 1 is a conceptual diagram of a ball finding system for detecting a ball in a series of images with a two-step machine learning process, according to one or more embodiments.

FIG. 1 is a conceptual diagram of a ball finding system 100 for detecting a ball in a series of images with a two-step machine learning process, according to one or more embodiments. System 100 includes coarse ball finder 101 and fine ball finder 102. Coarse ball finder 101 receives a series of original images 103 captured by one or more cameras (not shown) of ball finding system 100. Original images 103 are then resized into smaller images 104 (for e.g., using a bicubic or a bilinear or a down-sampling algorithm) to reduce the computation time of a subsequent classification step. For example, an original image of dimension of 2480×2480 pixels that is resized into a smaller image of 248×248 pixels will reduce computation time of the classification step by about 100 times.

Smaller images 104 are input into first neural network 105. In some embodiments, first neural network 105 has been trained to classify objects in images as balls. If first neural 105 does not detect a ball, then coarse ball finder 101 retrieves another series of original images 103 and repeats the previously described process until a ball is detected by first neural network 105. If a ball is detected 106, the fine ball finder 102 further processes smaller images 104. The output of first neural network 105 includes a rough estimation of the center coordinates and ball radius. Note that because original images 103 were resized to smaller images 104, there may be false positive classifications of balls in smaller images 104 by first neural network 105. Fine ball finder 102 is used to reduce the false positive classification output by first neural network 105.

Fine ball finder 102 maps smaller images 104 with positive classifications back to original images 103 at their original dimensions. Subsequently, regions of original images 103 that contain the mapped ball are cropped from original images 103 to create cropped (or local) regions. Visual tracker 107 applies a velocity ($v_n=(\Delta x_n, \Delta y_n)$ to the ball at location $B_n=(x_n, y_n, r_n)$ in the cropped/local region (having dimensions $k*r_n \times k*r_n$, where k is scaler) to generate a new image of the ball at location $\tilde{B}_{n+1}=(x_n+\Delta x_n, y_n+\Delta y_n, r_n)$ in the cropped region, where location $\tilde{B}_{n+1}$ is estimated based on the ball velocity. Note ($x_n, y_n$) are the center coordinates of the ball at location $B_n$ and $r_n$ is the radius of the ball. As seen in FIG. 1, the ball is shifted from $B_n$ to $\tilde{B}_{n+1}$ in the new image based on the ball velocity $v_n$ and it is assumed that the ball radius $r_n$ remains unchanged during the shifting. In some embodiments, the velocity of the mapped ball is based on a change in the center coordinates of the mapped ball. The new image having a region of interest (ROI) with the shifted ball is fed into second neural network 108. In some embodiments, the second neural network 108 has been trained to regress the center coordinates and radius of the ball and classify whether the object is the ball, based on a confidence score. In some embodiments, the confidence score can be binary: 0 (non-ball) or 1 (ball). For this embodiment, a threshold value is needed. For example, if the threshold value is 0.6 then any confidence score of 0.6 or above will have confidence score of 1, otherwise the confidence score is 0. A threshold of 0.6 is only an example and in practice, the threshold can be any value between 0 and 1.0.

If the shifted ball is classified as the ball 109, then the center coordinates and radius of the shifted ball are updated in the cropped region ($B_{n+1}=(x_{n+1}, y_{n+1}, r_{n+1})$), and second neural network 108 outputs the new image with a boundary box around the ball. In some embodiments, the ROI may be the boundary box. If there is no positive classification, then second neural network 108 returns control to coarse ball finder 101, which retrieves another series of original images 103 and repeats the process described above.

In some embodiments, first and second neural networks 105, 108 are deep learning networks, such as a convolutional neural network (CNN). For example, the first or second neural networks 105, 108 can be a residual network (ResNet) that is trained on actual, synthesized or augmented images of different types of balls under various environmental conditions (e.g., different lighting conditions). Other examples of classifiers that could be used to implement first and second neural networks 105, 108 include but are not limited to: DarkNet, VGGNet, AlexNet, DenseNet, and GoogleLeNet/Inception or any other suitable image-based deep learning network. In some embodiments, more than one classifier can be used to implement first and second neural networks 105, 108, and multiple neural networks can be arranged in any suitable architecture that includes any number of convolution, pooling and fully connected layers.

In some embodiments, first and second neural networks 105, 108 are trained using synthetic training data comprising images of balls augmented with at least one of shadows, sunshine, non-uniform lighting, complex background, artifacts, static balls, different ball sizes, moving background or dirty balls. The images in the training data for the first neural network 105 are resized to smaller images so that the first neural network 105 is trained on the same size images that it is expected to be received by the first neural network 105 during inference.

In some embodiments, visual tracker 107 is a mean-shift tracker 107. Some examples of mean-shift trackers include but are not limited to: kernel-based object tracking, ensemble tracking and CAMshift.

FIG. 2 is a flow diagram of process 200 of detecting a ball in a series of images with a two-step machine learning process, according to one or more embodiments. Process 200 can be implemented by the ball finding system 100, 300 shown in FIGS. 1 and 3.

Referring to FIG. 2, process 200 includes: training a first neural network to classify a ball in a time series of images based on a first set of training images (201); receiving the time series of images (202); resizing the received time series of images (203), resizing may include resizing original images to smaller size of images; detecting a moving object in the resized time series of images (204); classifying, with the first neural network that has been trained as described above, whether the moving object is a ball based on the resized time series of images (205); mapping the classified ball in the resized time series of images to the time series of images (206); and cropping regions in the time series of images that include the mapped ball (207).

Process 200 continues by: training a second neural network to classify an object as a ball in a time series of images based on a second set of training images (208); shifting the mapped ball in the time series of images based on a velocity of the mapped ball in the cropped regions (209); regressing, with the second neural network, the center coordinates and radius of the shifted ball (210); classifying, with the second neural network, whether the shifted ball is the ball based on a confidence score (211), and updating the shifted ball in the cropped regions based on the regressed center coordinates, radius and confidence score (212). Each of these steps was previously described in detail in reference to FIG. 1. In some embodiments, the first set of training images is the same as the second set of training images. In some embodiments, the image size of the second set of training images may be larger, the same or smaller than the image size of the first set of training images.

Figure 3:
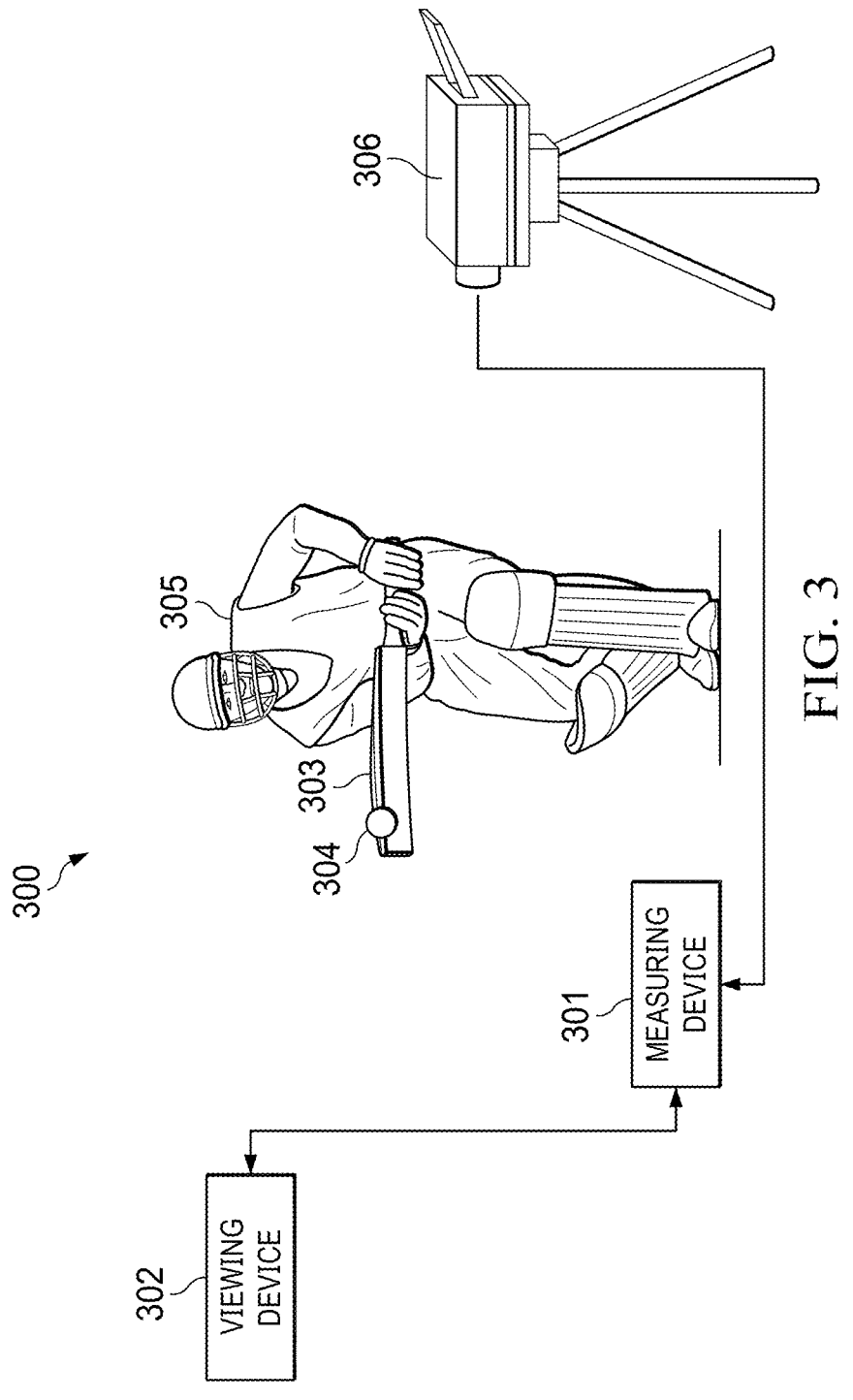
FIG. 3 is an example ball finding system, according to one or more embodiments.

FIG. 3 is an example ball finding system 300, according to one or more embodiments. System 300 includes measuring device 301, viewing device 302, and one or more cameras 306. Measuring device 301 can include at least one processor (e.g., a microprocessor) and at least one computer-readable medium (e.g., memory) storing instructions that when executed by the at least one processor causes the at least one processor to perform the operations described in reference to FIG. 2 to detect ball 304 (e.g., a cricket ball) captured in a series of images captured by one or more cameras 306 after being hit with ball striking element 303 (e.g., a cricket bat) swung by player 305 (e.g., a cricket player). Note that although cricket is the sport referenced in this example, ball finding systems 100, 300 described herein are also applicable to finding any type of moving ball in a series of images (e.g., golf ball, baseball, basketball, soccer ball). In some embodiments, the cameras may be video cameras, high-speed cameras or high-resolution cameras.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:
capturing a time series of images;
resizing the time series of images;
detecting a moving object in the resized time series of images;
mapping the moving object in the resized time series of images to the time series of images;
cropping regions in the time series of images that include the mapped moving object;
classifying, with a trained first neural network, the moving object as a ball based on the resized time series of images;
shifting the ball in the time series of images based on a velocity of the ball in the cropped regions;

regressing, with a trained second neural network, center coordinates and a radius of the shifted ball;
classifying, with the trained second neural network, whether the shifted ball is the ball, based on a confidence score; and
updating the shifted ball in the cropped regions based on the regressed center coordinates, radius and confidence score.

2. The method of claim 1, wherein resizing includes resizing the time series of images to a dimension smaller than the time series of images.

3. The method of claim 1, wherein the velocity of the ball is based on a change in center coordinates of the ball.

4. The method of claim 1, wherein the first and second neural networks are trained using synthetic training data comprising images of balls augmented with at least one of shadows, sunshine, non-uniform lighting, complex background, artifacts, static balls, different ball sizes, moving background or dirty balls.

5. The method of claim 1, wherein the ball is a cricket ball.

6. The method of claim 1, wherein the time series of images includes at least two image frames.

7. A system comprising:
at least one camera configured to capture a time series of images;
at least one processor configured to:
resize the time series of images; and
detect a moving object in the resized time series of images;
map the moving object in the resized time series of images to the time series of images; and
crop regions in the time series of images that include the mapped moving object;
a first neural network trained to classify the moving object as a ball based on the resized time series of images; and
a second neural network trained with a second set of training images, and the at least one processor is configured to:
shift the ball in the time series of images based on a velocity of the ball in the cropped regions;
regress, with the second neural network, center coordinates and a radius of the shifted ball;
classify, with the second neural network, whether the shifted ball is the ball, based on a confidence score; and
update the shifted ball in the cropped regions based on the regressed center coordinates, radius and confidence score.

8. The system of claim 7, wherein the time series of images is resized to a dimension smaller than the time series of images.

9. The system of claim 7, wherein the velocity of the ball is based on a change in center coordinates of the ball.

10. The system of claim 7, wherein the first and second neural networks are trained using synthetic training data comprising images of balls, wherein the images of balls are augmented with at least one of shadows, sunshine, non-uniform lighting, complex background, artifacts, static balls, different ball sizes, moving background or dirty balls.

11. The system of claim 7, wherein the ball is a cricket ball.

12. The system of claim 7, wherein the time series of images includes at least two image frames.

* * * * *